United States Patent [19]
Koyama

[11] Patent Number: 6,052,540
[45] Date of Patent: *Apr. 18, 2000

[54] VIEWFINDER DEVICE FOR DISPLAYING PHOTOGRAPHIC INFORMATION RELATING TO OPERATION OF A CAMERA

[75] Inventor: Takeshi Koyama, Kanagawa-ken, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/781,918

[22] Filed: Dec. 30, 1996

Related U.S. Application Data

[63] Continuation of application No. 08/438,878, May 10, 1995, abandoned, which is a continuation of application No. 08/117,674, Sep. 8, 1993, abandoned.

[30] Foreign Application Priority Data

Sep. 11, 1992 [JP] Japan ..................... 4-269712
Sep. 22, 1992 [JP] Japan ..................... 4-279433

[51] Int. Cl.[7] .................................................. G03B 17/20
[52] U.S. Cl. ............................................ 396/296; 396/378
[58] Field of Search ...................................... 396/148, 149, 396/296, 373, 377, 378, 379, 380, 381, 385, 386

[56] References Cited

U.S. PATENT DOCUMENTS

| | | | |
|---|---|---|---|
| 4,200,380 | 4/1980 | Sato et al. | 354/219 |
| 4,576,458 | 3/1986 | Cho et al. | 354/199 |
| 5,255,030 | 10/1993 | Mukai et al. | 354/159 X |
| 5,552,845 | 9/1996 | Nagao et al. | 396/380 |

FOREIGN PATENT DOCUMENTS 53-32048  3/1978  Japan .

*Primary Examiner*—Howard B. Blankenship
*Attorney, Agent, or Firm*—Fitzpatrick, Cella, Harper & Scinto

[57] ABSTRACT

A viewfinder device includes an objective lens, a hologram disposed in a place other than a prescribed image plane of the objective lens and a plane conjugate to the prescribed image plane, and an illumination device for illuminating the hologram. The position of a virtual image formed by the hologram is arranged to coincide with the prescribed image plane or the plane conjugate to the prescribed image plane, so that displays can be made in an adequate state within the visual field of a viewfinder.

12 Claims, 7 Drawing Sheets

VIEWFINDER DEVICE FOR DISPLAYING PHOTOGRAPHIC INFORMATION RELATING TO OPERATION OF A CAMERA

This application is a continuation of application Ser. No. 08/438,878 filed May 10, 1995, which is a continuation of 08/117,674 filed Sep. 8, 1993, now abandoned.

BACKGROUND OF THE INVENTION

1. Field of the Invention

This invention relates to a viewfinder device and more particularly to a display of information within a visual field of a viewfinder in an image pickup apparatus such as a camera or the like.

2. Description of the Related Art

Image pickup apparatuses such as cameras or the like have heretofore been arranged to display, within a viewfinder, information of various kinds for taking pictures, including, among others, a distance measurement mark indicating a distance measuring range. For making such information displays, many methods have been proposed and put into practice. According to these conventional methods, the patterns of display information are formed by vapor deposition on a transparent member made of glass or an acrylic resin or by combining fine wedge-shaped prisms. Meanwhile, a camera information mark display device arranged to use a hologram has been proposed in Japanese Laid-Open Patent Application No. SHO 53-32048.

To enable the display information to be visible along with an object image, the conventional viewfinder device is arranged to have a pattern plane which has the patternized display information formed thereon arranged either on the image forming plane of an objective lens or near to a plane conjugate to it. The pattern plane having the display information is positioned to coincide with the diopter of a viewfinder optical system.

However, since the position of the information display member is thus arranged to coincide with the diopter of the viewfinder, if any dust, a stain or the like comes to stick to this member, the stain or the like would show in an enlarged state as the eyepiece of the viewfinder optical system acts as a magnifier.

In view of this problem, it is desirable to have a free (vacant) space without any optical part on the image forming plane of the objective lens or near to its conjugate plane, i.e., at a place which coincides with the diopter of the viewfinder. However, it has been difficult to realize such an arrangement.

Meanwhile, many cameras of the kind having a so-called panorama mode have recently been proposed. They are arranged to give a laterally long picture by partly trimming an image pickup (or photo-taking) plane to change its aspect ratio from 4:3 to, for example, 36:13.

Generally, it is desirable that a camera is arranged to give, by the visual field of a viewfinder, a sight-taking range corresponding to the range of a picture to be actually taken. To meet this requirement, the camera of the kind having the panorama mode is arranged such that, when the image pickup plane is narrowed by inserting a photo-taking range limiting member into a photo-taking system so as to switch an ordinary mode over to the panorama mode for taking a panoramic picture, the viewfinder field is also narrowed by arranging a light shielding member to partly shield the viewfinder system from light to give a laterally long viewfinder field.

In the case of the conventional camera of the kind having the panorama mode, the light shielding member is arranged near the image forming plane of the viewfinder to be retractably insertable to make the viewfinder field laterally long in taking a sight for a panorama shot.

However, with the light shielding member thus arranged to be insertable and retractable, dust, dirt or the like tends to stick to the image forming plane of the viewfinder to make the viewfinder field dirty. Besides, the dust or the dirt tends to be sighted at the same diopter as an image formed within the viewfinder.

SUMMARY OF THE INVENTION

It is a first object of this invention to provide a viewfinder which is arranged to facilitate taking a sight through the viewfinder.

It is a second object of this invention to provide a viewfinder which is arranged for a camera of the kind having a variable image plane size to facilitate taking a sight through the viewfinder.

It is a third object of this invention to provide a device for indicating the current photographic mode of a camera by causing an illumination means to illuminate, with different wavelengths, an image reproduced by a hologram.

To attain these objects, a camera arranged according to this invention as a preferred embodiment thereof comprises objective lens means, a hologram disposed in a place other than a prescribed image plane or a conjugate plane thereto of the objective lens means, and illumination means for illuminating the hologram, wherein the position of a virtual image formed by the hologram is arranged to coincide with the prescribed image plane or the conjugate plane. Further, a camera according to this invention as another embodiment thereof comprises varying means for varying a photo-taking image plane area, viewfinder means, and display means for displaying a mark outside an effective area within a viewfinder field of the viewfinder means in association with the photo-taking image plane area being limited by the varying means.

The above and other objects and features of this invention will become apparent from the following detailed description of embodiments thereof taken in connection with the accompanying drawings.

DETAILED DESCRIPTION OF THE PREFERRED EMBODIMENTS

Figure 1:
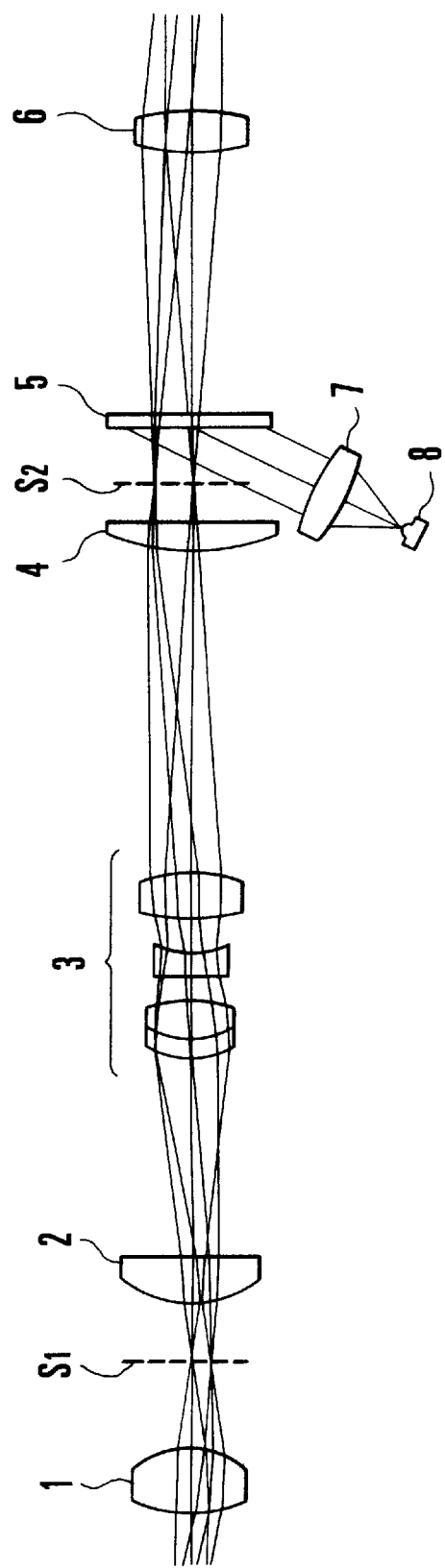
FIG. 1 shows in outline the arrangement of essential parts of an optical system of a first embodiment of this invention.

FIG. 1 shows in outline the essential parts of an optical system of a first embodiment of this invention. Referring to FIG. 1, an objective lens 1 is arranged to form an object image on a primary image forming plane S1. The optical system further includes a first field lens 2, an erector lens arranged to re-form the image formed by the objective lens 1, a second field lens 4 and a secondary image forming plane S2. The arrangement of the optical system up to this point is identical with the conventional optical system. The first embodiment is characterized by the further arrangement of its parts described below:

These parts include a transparent hologram information display element 5, an eyepiece 6, an illumination lens 7 and an LED (light emitting diode) 8. As shown in FIG. 1, no optical member is disposed on the primary image forming plane S1, the secondary image forming plane S2 or in the neighborhood of these image forming planes S1 and S2.

If the surface of any optical member is located on the primary and secondary image forming planes S1 and S2 or in the neighborhood of them, any scar, dust, dirt, stain or the like on the surface would show in a state of being enlarged by the eyepiece 6. Further, if these parts are located within a transparent member made of glass or an acrylic resin or the like, foam and dust existing within the member also would show in a state of being enlarged by the eyepiece 6. To avoid this inconvenience, the optical system of FIG. 1 is arranged to have these parts located within void spaces, so that the embodiment is never affected by such dust, dirt, scars and the like.

Despite the absence of any optical member in the neighborhood of the primary and secondary image forming planes S1 and S2, information available from the viewfinder can be displayed within the viewfinder field in a state of coinciding with the diopter by virtue of the action of the hologram information display element 5. In the optical system of FIG. 1, when light from the LED 8 falls on the hologram information display element 5, contents of display information recorded on the hologram information display element 5 is displayed as a virtual image in a position which corresponds to the secondary image forming plane S2.

When a camera operator looks through the eyepiece 6, the information display is seen within the viewfinder field in a state of being superimposed on an object image. Since the position of the virtual image which is reproduced by the hologram information display element 5 coincides with the secondary image forming plane S2 on the optical axis of the viewfinder optical system, the information displayed within the viewfinder can be seen in a state of coinciding with the diopter.

Figure 4:
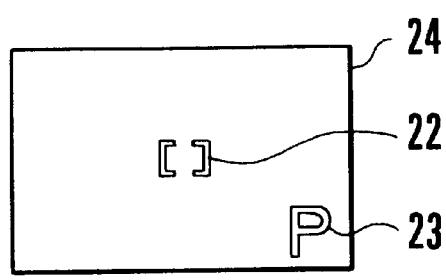
FIG. 4 shows an example of a display of information made within a viewfinder.

FIG. 4 shows by way of example the contents of a display made within the viewfinder field. Within a visual field 24 which is in a rectangular shape, a mark 22 indicating a distance measurement range and a letter 23 indicating one of various shooting modes are displayed in a state of being superimposed on an object image.

Figure 2:
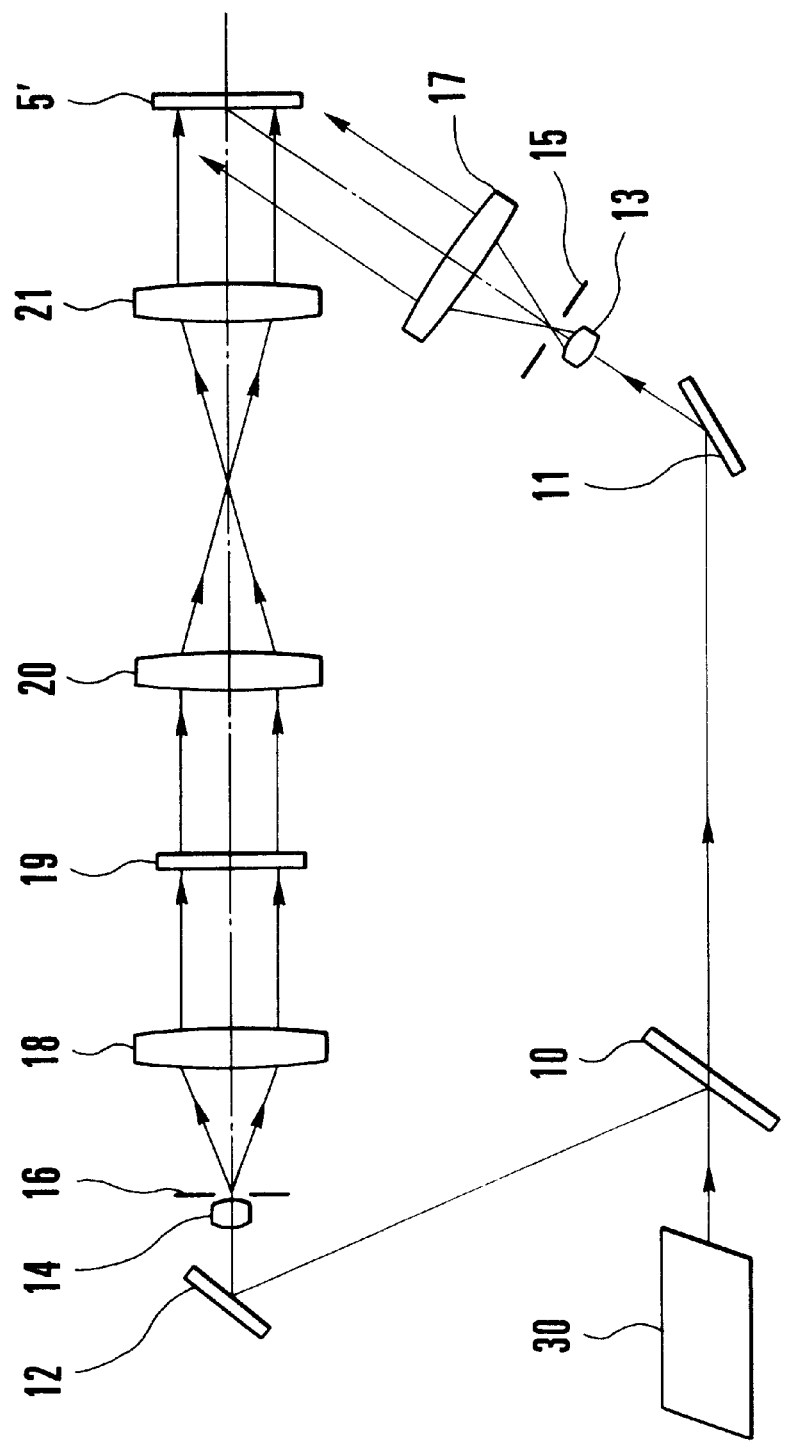
FIG. 2 shows a method for forming a hologram information display element of the first embodiment.

FIG. 2 shows a process of forming the hologram information display element 5 to be used in accordance with this invention. The illustration includes a laser beam source 30, a half (semi-transparent) mirror 10 which is arranged to split and divide a bundle of rays into a reference optical path for photographing a hologram and an object optical path, a mirror 12, objective lenses 13 and 14 of a microscope, pin holes 15 and 16 for making laser beams into a neat shape, and collimator lenses 17 and 18. Of the laser beams thus shaped, the light of the laser beam on the side of the object optical path passes through a display information mask 19 to illuminate and project the display information on a recording photosensitive material 5' through image forming lenses 20 and 21.

The other beam of light divided by the half mirror 10 also comes to fall on the same photosensitive material 5' as reference light together with the object light which has passed through the mask 19. Interference fringes are formed by the interference between the two and are recorded on the photosensitive material 5'. The interference fringes thus recorded are converted into a rugged shape by a known method to form a transmission-type hologram. The transmission-type hologram is passed through a mold to make it into a hologram information display element, which is suited for mass production. A reproduced image of the mask 19 can be obtained by illuminating the hologram with light similar to the reference light used in recording.

The position of the reproduced image of the mask 19 in the direction of the optical axis can be set as desired by shifting the conjugate relation between the mask 19 and the photosensitive material 5' to a predetermined extent. As apparent from FIG. 1, the extent of shift can be known while the viewfinder system is in the stage of being designed. With the position of the photosensitive material 5' thus shifted from the image forming position of the mask 19, the image of the mask 19 can be reproduced in a void space deviating from the plane of the photosensitive material 5'. Since the size of the display information within the viewfinder is known beforehand, the image of the mask 19 can be formed on the photosensitive material 5' not only in a desired position but also at a desired rate of magnification.

The hologram is reproduced preferably under the same conditions as the conditions under which it is formed. Therefore, with the reference light collimated when the hologram is formed as shown in FIG. 2, the optical system shown in FIG. 1 is also arranged to have the light of the LED 8 collimated by the illumination lens 7. In actuality, while the hologram is formed by means of laser beams, the reproduction is effected by means of the LED. Some color deviation will take place at the time of reproduction, if the position of the reproduced image deviates too much from the plane of the photosensitive material 5'. However, use of an LED which has a narrow width of spectrum as a light source, in addition to the arrangement of minimizing the extent of deviation of the reproduced image from the photosensitive material 5', makes the adverse effect of such color deviation negligible.

Figure 3:
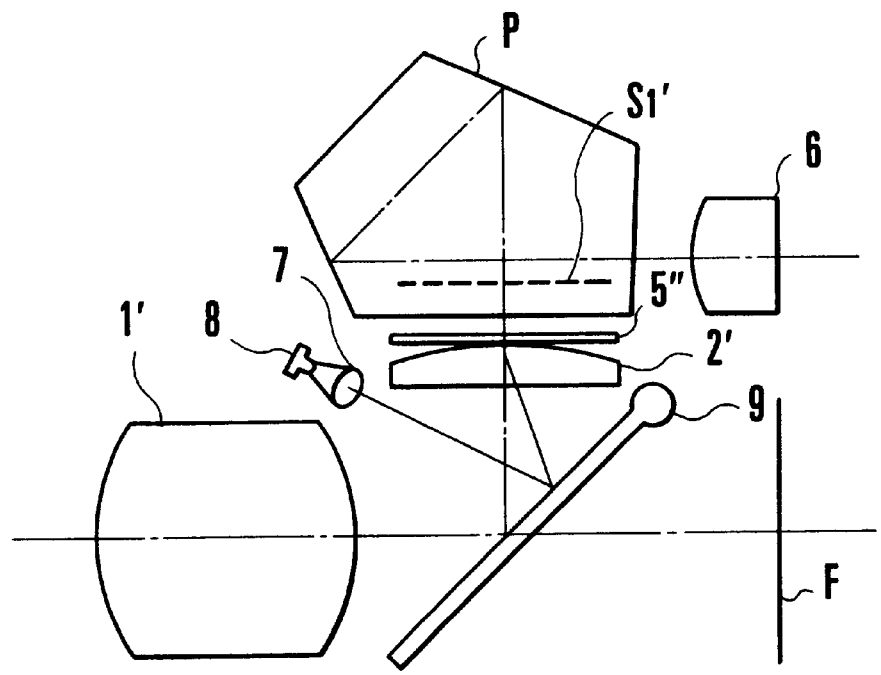
FIG. 3 shows in outline the arrangement of essential parts of a single-lens reflex camera arranged as a second embodiment of this invention.

FIG. 3 shows in outline the arrangement of the essential parts of a single-lens reflex camera which is arranged as a second embodiment of this invention. The illustration includes an objective lens 1', a field lens 2', a transparent hologram information display element 5', an eyepiece 6, a hologram illuminating lens 7, an LED 8, a quick return mirror 9, a hollow pentagonal roof mirror P, and a film surface F. An image of an object is formed by the objective lens 1' on a primary image forming plane S1'. The primary image forming plane S1' corresponds to a void place coinciding with the diopter of the eyepiece 6. An information display is made within the viewfinder field in the position of the primary image forming plane S1'. The display is made by means of the hologram information display element 5" which is disposed in a position deviating from the primary image forming plane S1'.

In the case of this (second) embodiment, light from the LED 8 is projected on the hologram information display element 5" through the lens 7 and the quick return mirror 9 to form a reproduced image of display information in the position of the primary image forming plane S1'. As a result, the display information is displayed in a state of being superimposed on the object image.

Since the pentagonal roof mirror P is formed in a hollow state, no optical element is located in the neighborhood of the primary image forming plane S1'. A reflection light coming from the quick return mirror 9 and light going to the eyepiece 6 intersect each other in an area located in the neighborhood of the primary image forming plane S1'. It is impossible to arrange any information display element within this area if the display element is arranged in the conventional manner.

In this case of the embodiment, however, the display information is projected to the position of the primary image forming plane S1. Therefore, the position of the hologram information display element 5" deviates not only from the primary image forming plane S1' but also from the area where optical paths are configured to allow beams of light to coexist there. Limiting conditions imposed the design of such an optical system that ordinarily discourage any attempt to arrange elements therein because of excessively complex optical paths can be eased by the use of a hologram.

Further, in the case of FIG. 3, the position of the primary image forming plane S1' may extend into the hollow pentagonal roof mirror P. Therefore, the position of the roof mirror P can be greatly lowered for reduction in size of the single-lens reflex camera.

While the hologram display element shown in each of the embodiments described is of the transmission type, this invention is not limited to this type but may be applied also to a system using a reflection-type hologram.

As described above, in accordance with this invention, the hologram information display element is disposed in a position deviating from the image forming plane of the objective lens, or a plane conjugate to it, which coincides with the diopter of the viewfinder optical system and the image of display information reproduced from the hologram information display element is used. This arrangement permits a display of information within the viewfinder in a state of coinciding with the diopter of the viewfinder optical system without placing any member on the above-stated image forming plane or its conjugate plane for the purpose of displaying information within the viewfinder. As a result, dust, dirt or the like, existing within the viewfinder, can be effectively prevented from deteriorating the quality of a view obtainable through the viewfinder.

The arrangement of the present of projecting the reproduced image of the display information by means of the hologram information display element allows design latitude for the arrangement of optical elements. For example, the combination with the hollow pentagonal roof mirror P shown in FIG. 3 eases the limitations imposed on the arrangement of optical elements due to complexly overlapping beams of light. As a result, the size of the camera can be reduced without impairing the information display function of the viewfinder system.

Figure 5:
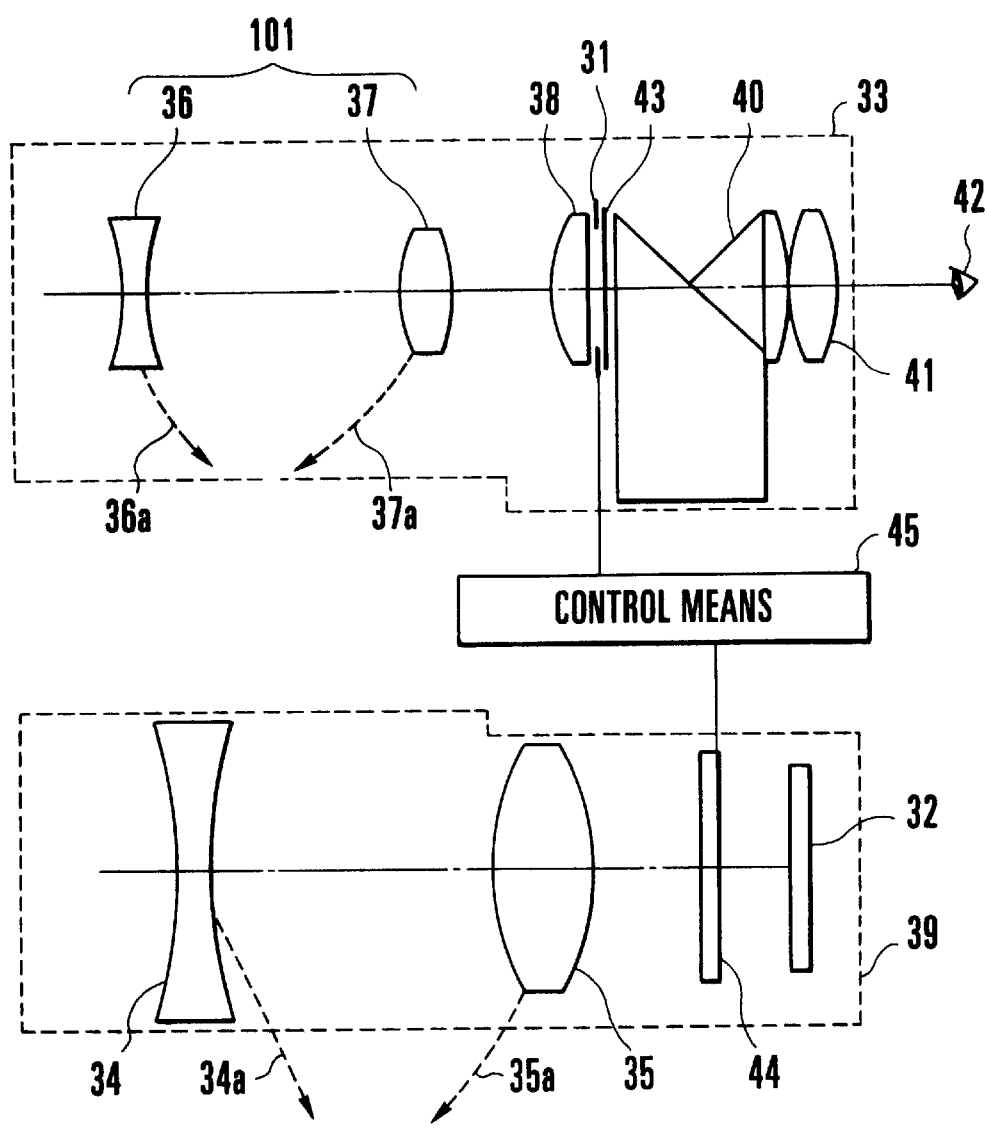
FIG. 5 shows in outline the arrangement of essential parts of a lens-shutter type camera to which a viewfinder device arranged according to this invention is applied as a third embodiment of this invention.

FIG. 5 shows in outline the arrangement of essential parts of a lens-shutter-type camera to which a viewfinder device arranged according to this invention is applied as a third embodiment of this invention.

Referring to FIG. 5, a photo-taking system (a photo-taking lens) 39 includes a zoom lens. A viewfinder device 33 includes a secondary-image-forming, real-image type viewfinder system and is arranged discretely from the photo-taking system 39. The photo-taking system 39 has a lens group 34 of negative refractive power and a lens group 35 of positive refractive power. The magnifying power of the photo-taking system 39 is variable by moving these lens groups 34 and 35 on an optical axis between wide-angle end and telephoto end positions as shown by arrows 34*a* and 35*a*. Reference numeral 32 denotes a photosensitive matter which is a film surface or a solid-state image sensor, such as a CCD.

Photo-taking area limiting means 44 is arranged to be insertable and retractable into and out of an optical path and to be inserted into the optical path when the camera is in a panorama mode (photo-taking area limiting mode) in such a way as to block part of a photo-taking range area vertically so as to make it into a laterally long shape having, for example, an aspect ratio of 36:13.

An objective lens 101 includes a lens group 36 of negative refractive power and a lens group 37 of positive refractive power. These lens groups 36 and 37 are arranged to perform a magnifying power varying action by moving on an optical axis, in association with the power varying action of the photo-taking system 39, as shown by arrows 36*a* and 37*a* between wide-angle end and telephoto end positions.

A field lens 38 is arranged in the neighborhood of an image forming plane 43 to converge an off-axial bundle of rays and to guide it to a subsequent group of lenses. A viewfinder field frame 31 is disposed in the neighborhood of the image forming plane 43 on which a viewfinder image is formed by the objective lens 101.

Figure 6:
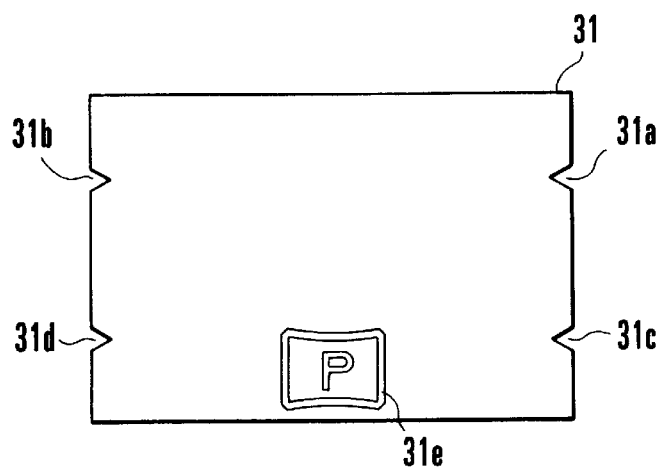
FIG. 6 shows a part of FIG. 5.

Referring to FIG. 6 which shows the viewfinder field frame 31, there are provided indexes (notches) 31*a* to 31*d* in the periphery of the viewfinder field frame 31 to indicate a photo-taking (shooting) range to be used when the camera is in the panorama mode. An area defined by line segments obtained by connecting the index points 31*a* and 31*b* and obtained by connecting the index points 31*c* and 31*d* represents a view finder field (shooting range) to be used in the case of the panorama mode. A mark 31*e* indicates information on the panorama mode (photo-taking area limiting mode) and is disposed outside the photo-taking range for the panorama mode.

In FIG. 5, reference numeral 40 denotes a non-inverted erecting image prism, which is provided as image inverting means. For example, the non-inverted erecting image prism 40 is composed of a Porro prism and is arranged to invert a viewfinder image formed upside-down on the image forming plane 43 into a non-inverted erecting image. An eyepiece 41 is arranged to permit viewing the viewfinder image formed on the image forming plane 43 from a sighting pupil 42 through the non-inverted erecting image prism 40.

In taking a shot in the panorama mode, control means 45 inserts the photo-taking area limiting means 44 into the optical path. At the same time, the panorama mode information mark 31*e* is displayed, outside the effective photo-taking area of the viewfinder field, in a superimposed state to show that the shot is in the panorama mode in which the photo-taking range is limited.

The third embodiment of this invention is thus arranged to display a panorama mode photo-taking range and the panorama mode information without using any moving member within the viewfinder device in taking a shot in the panorama mode. This arrangement prevents intrusion of dust, dirt, etc., into the viewfinder system, so that the viewfinder image and information of various kinds can be adequately viewed without being affected by the adverse effect of such foreign substances.

Figure 7:
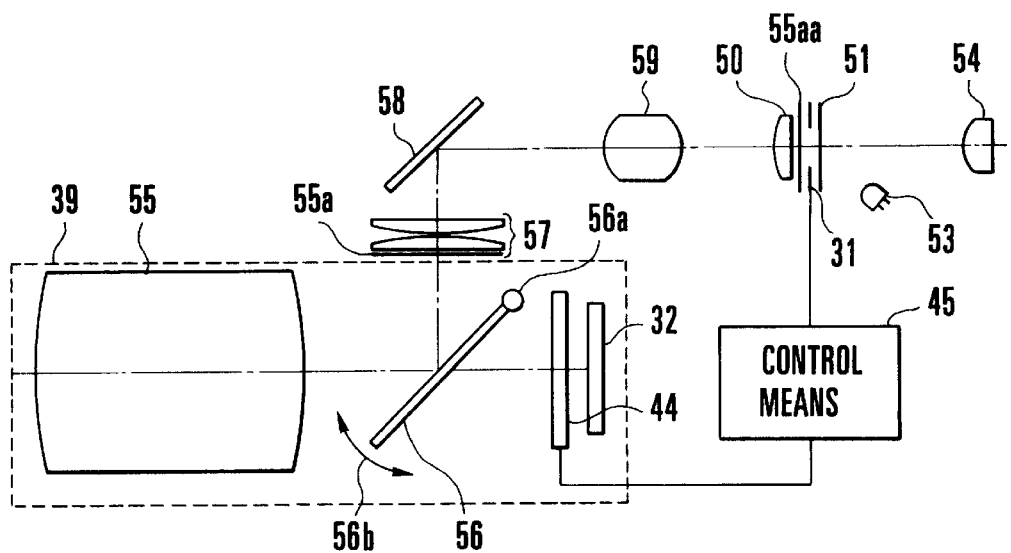
FIG. 7 shows in outline the arrangement of essential parts of a single-lens reflex camera to which a viewfinder device arranged according to this invention is applied as a fourth embodiment of this invention.

FIG. 7 shows in outline the arrangement of the essential parts of a single-lens reflex camera to which a viewfinder device arranged according to this invention is applied as a fourth embodiment of this invention. The fourth embodiment is characterized by the use of a reflection type relief hologram 51 for the display of panorama mode information.

Referring to FIG. 7, the illustration includes an objective lens 55, a quick return mirror 56 which is arranged to be swingable on a rotation shaft 56a in the direction of arrow 56b, and a photosensitive surface 32 which is a film surface or an image pickup plane. A primary image forming plane 55a is arranged through the quick return mirror 56 to be a plane equivalent to the photosensitive surface 32. On the primary image forming plane 55a is formed an object image (a viewfinder image, a spatial image) by the objective lens 55.

Photo-taking area limiting means 44 is similar to that of the third embodiment shown in FIG. 5. A first field lens 57 is disposed in the vicinity of the first image forming plane 55a to converge a bundle of rays based on the object image formed on the first image forming plane 55a and to efficiently guide it to an optical element arranged subsequent thereto. There is provided a mirror 58.

A reimaging system (erector) 59 is arranged to cause the object image on the primary image forming plane 55a to be re-formed on a secondary image forming plane 55aa as a non-inverted erecting image. A second field lens 50 is arranged to make its rear surface approximately coincide with the secondary image forming plane 55aa. The primary and secondary image forming planes 55a and 55aa are arranged to be optically conjugate to each other through the second field lens 50.

A viewfinder field frame 31 is disposed in the vicinity of the secondary image forming plane 55aa to limit the visual field of the viewfinder. The viewfinder field frame 31 is provided with indexes 31a to 31d which are arranged as shown in FIG. 6 to indicate a photo-taking range to be used in the panorama mode. The reflection type relief hologram 51 is disposed in the vicinity of the secondary image forming plane 55aa. The hologram 51 is provided with a panorama mode information (mark) 31e, which is, as shown in FIG. 6, recorded in a position outside an effective photo-taking range. Light source means 53 consists of light emitting diodes (LED) or the like and is arranged outside the optical path of the viewfinder to illuminate the hologram 51 with reproducing light. An eyepiece 54 is provided for viewing a viewfinder image re-formed on the secondary image forming plane 55aa and the panorama mode information recorded on the hologram 51.

In the case of this (fourth) embodiment, the light source means 53 is extinguished when the camera is in an ordinary shooting mode. Under this condition, the hologram 51 is in a transparent state. In taking a shot in the panorama mode, the control means 45 inserts the photo-taking area limiting means 44 into an optical path and, at the same time, causes the reproducing light from the light source means 53 to illuminate the hologram 51. The hologram 51 then displays the panorama mode information 31e, in a superimposed state, outside the effective panorama photo-taking range of the viewfinder field, as shown in FIG. 6.

Figure 8:
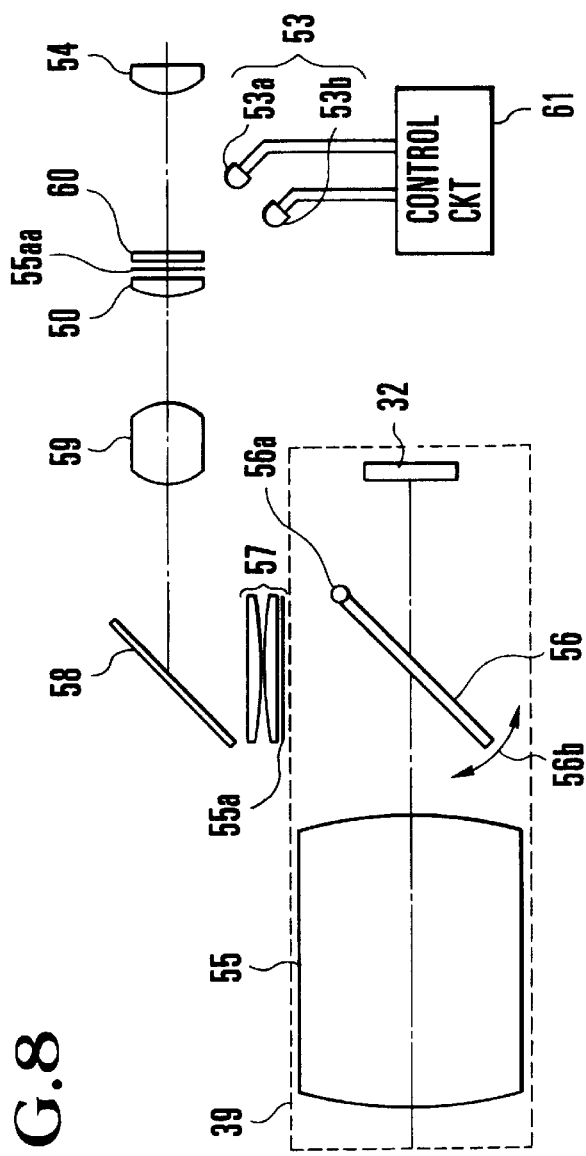
FIG. 8 shows in outline the arrangement of essential parts of a single-lens reflex camera to which a viewfinder device arranged according to this invention is applied as a fifth embodiment of this invention.

FIG. 8 shows in outline the essential parts of a viewfinder device which is arranged according to this invention as a fifth embodiment thereof. In FIG. 8, the same elements as those of the fourth embodiment shown in FIG. 7 are indicated by the same reference numerals.

Figure 9:
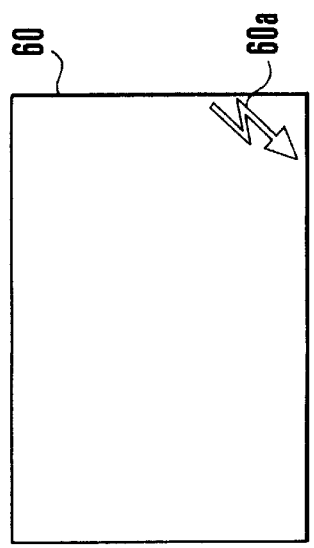
FIG. 9 shows a part of FIG. 8.

In the fifth embodiment, a viewfinder image formed on a primary image forming plane 55a by an objective lens 55 is re-imaged on a secondary image forming plane 55aa through a first field lens 57 and a mirror 58 by a re-imaging system (erector). A hologram 60 is disposed in the vicinity of the secondary image forming plane 55aa. With the light source means 53 lighted up, the viewfinder image formed on the secondary image forming plane 55aa can be viewed by means of an eyepiece 54 together with information 60a which is recorded on the hologram 60. The hologram 60 is a rainbow-type relief hologram. As shown in FIG. 9, the above-stated information (mark) 60a is written in a part of the hologram 60.

The rainbow-type hologram 60 is arranged in a known manner and shows a rainbow color when illuminated for reproduction with white light. The relief hologram diffracts light by its rugged surface and is manufactured by a known hot pressing method.

The light source means 53 includes a plurality of light sources 53a and 53b which are arranged to emit bundles of rays having different main wavelengths. While the two light sources 53a and 53b are shown in FIG. 8, the number of the light sources may be more than two. The light source 53a includes a red light emitting diode and the other light source 53b includes a green light emitting diode.

In the case of this (fifth) embodiment, one of the light sources of the light source means 53 is lighted up and the information 60a recorded on the hologram 60 is viewed in a color of light obtained from this light source.

Figure 10:
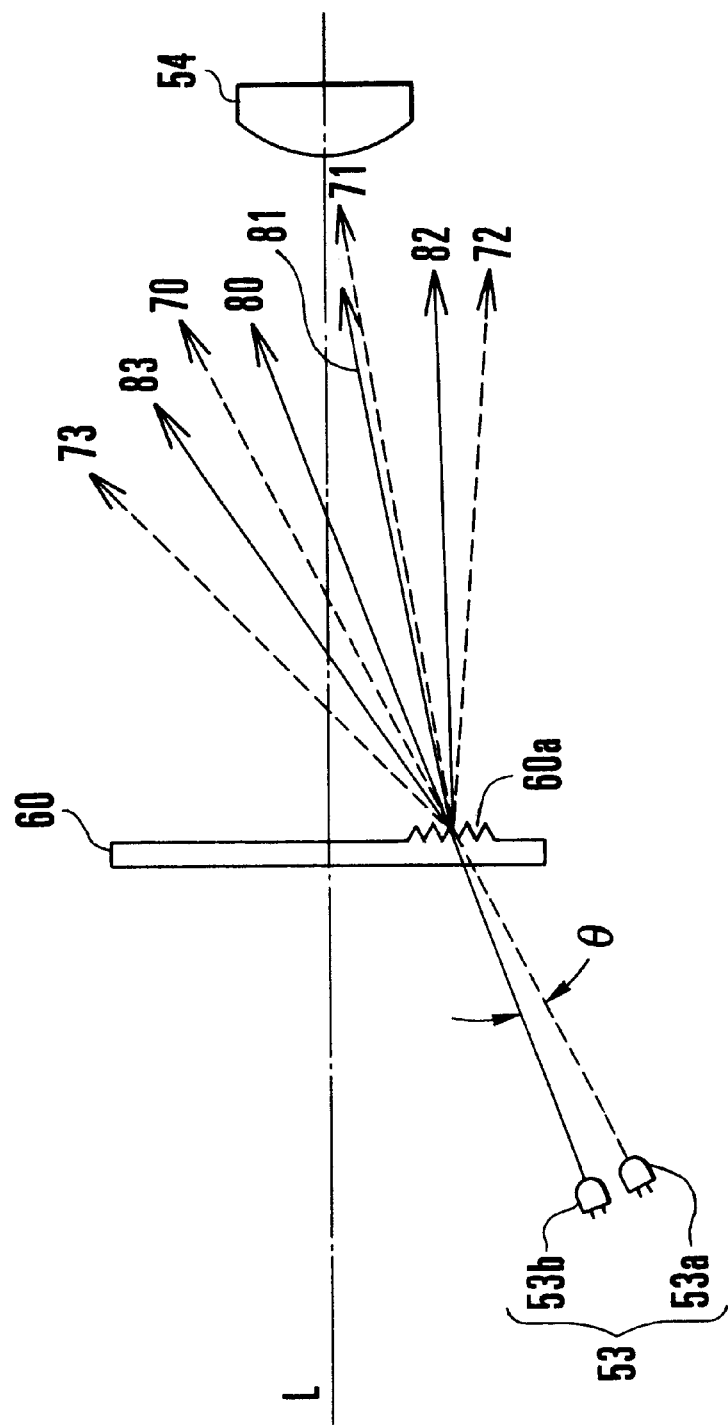
FIG. 10 shows a diffracted state of rays of light obtained by the arrangement shown in FIG. 8

FIG. 10 shows diffracted rays of light obtained from the hologram 60 when the hologram 60 is illuminated with reproducing light emitted from the light source means 53. Referring to FIG. 10, rays 70 to 73 indicated by broken lines respectively represent a zero-degree diffracted ray, a negative primary diffracted ray, a negative secondary diffracted ray and a primary diffracted ray resulting from a bundle of rays emitted from the red light emitting diode 53a. Rays 80 to 83 indicated by full lines likewise represent diffracted rays resulting from a bundle of rays emitted from the green light emitting diode 53b. In FIG. 10, reference symbol L denotes the optical axis of the viewfinder system.

In the case of this embodiment, the information is displayed by utilizing the wavelength dependency of light diffracted by the hologram.

Referring to FIG. 10, the red light emitting diode 53a and the green light emitting diode 53b illuminate the hologram 60 with reproducing light at an angle difference θ. This angle difference θ is set in such a way as to have the negative primary diffracted rays 71 and 81 from the hologram 60 diffracted toward the eyepiece 54 approximately in the same direction.

Diffracted rays of other degree numbers do not come to fall on the eyepiece 54 and are arranged to be diffracted in directions in which they are not seen. The arrangement is such that one information display can be made in three different states including a transparent state, a red color state and a green color state by switching the illuminated and extinguished states of the light sources 53a and 53b from one over to the other.

The embodiment shown in FIG. 8 is arranged to operate, for example, as follows: When the camera is in the ordinary shooting mode, only the viewfinder image is viewable while the information 60a recorded on the hologram 60 is left in the transparent state by keeping the two light emitting diodes 53a and 53b in their extinguished states. When the camera is in a flash photography mode, the charged state of a flash device is displayed by showing the information 60a in red during the process of charging the flash device and in green upon completion of the charging process to indicate that the flash device has been completely charged. Light emitting operations of the light sources 53a and 53b are controlled by a control circuit 61.

The advantages of th is invention are recapitulated as follows:

In the case of a camera of the kind having the panorama mode, information on the panorama shooting mode and the photo-taking area for panorama shooting is displayed within the viewfinder field, without using any moving member, when the action of the photo-taking-area limiting means is performed for a panorama shot within the photo-taking system. The display arrangement effectively prevents dust, dirt and the like from adhering to the image forming plane of the viewfinder, so that the viewfinder image can be viewed in an adequate state.

Further, in displaying and viewing information of a plurality of kinds within the viewfinder field by means of a hologram, the viewfinder device according to this invention is arranged such that the light source means which is provided for illuminating the hologram with reproducing light is appositely set to permit taking a sight of the information of various kinds in an adequate state along with the image of the viewfinder.

What is claimed is:

1. A viewfinder device comprising:
   objective lens means for forming a real image on a prescribed image plane;
   a hologram disposed in a place other than said prescribed image plane or a conjugate plane of said prescribed image plane;
   an eyepiece for sighting said real image formed by said objective lens means, and
   illumination means for illuminating said hologram to project an image of said hologram directly toward said eyepiece.

2. A viewfinder device according to claim 1, further comprising a mirror arranged to reflect light coming from said objective lens means and arranged to be swingable, wherein said illumination means is arranged to illuminate said hologram by utilizing the reflection of said mirror.

3. A viewfinder device according to claim 1, wherein said hologram is arranged to be of a transmission type.

4. A viewfinder device according to claim 1, wherein said objective lens means comprises a zoom lens.

5. A viewfinder device according to claim 1, wherein the position of a virtual image formed by said hologram coincides with the position of the prescribed image forming plane or the conjugate plane.

6. A viewfinder device comprising:
   a hologram;
   a plurality of illumination means for illuminating said hologram by illumination operations, wherein said plurality of illumination means respectively produce light having visually distinguishable wavelengths; and
   eyepiece lens means for directly viewing a reproduced image of said hologram illuminated by said plurality of illumination means.

7. A viewfinder device according to claim 6, further comprising control means for controlling the illumination operations of said plurality of illumination means, said control means causing one of said plurality of illumination means to operate after having caused another of said plurality of illumination means to operate.

8. A viewfinder device according to claim 6, wherein the reproduced image of said hologram is an indication relating to a camera photographic operation.

9. A viewfinder device according to claim 8, wherein said indication is an information display relating to a flash photography.

10. A camera comprising:
    variation means for changing a phototaking state of the camera from a normal phototaking state to a panorama phototaking state,
    viewfinder means for viewing a viewfinder field corresponding to a normal phototaking image plane area, the viewfinder field of the camera remaining substantially unchanged when said variation means changes the phototaking state between the normal phototaking state and the panorama phototaking state, and
    indication means for indicating to an operator that the camera is in the panorama phototaking state by superposing a panorama mark within the viewfinder field in response to a change from the normal phototaking state to the panorama phototaking state by said variation means, such that said indication means does not influence a viewfinder image in an area other than the panorama mark in the viewfinder field.

11. A camera according to claim 10, wherein said viewfinder means is arranged to form a real image.

12. A camera according to claim 11, wherein said indication means comprises a hologram and illumination means for illuminating said hologram.

* * * * *

UNITED STATES PATENT AND TRADEMARK OFFICE
CERTIFICATE OF CORRECTION

PATENT NO. : 6,052,540
DATED : April 18, 2000
INVENTOR(S) : TAKESHI KOYAMA

It is certified that error appears in the above-identified patent and that said Letters Patent is hereby corrected as shown below:

On the Title Page

At [75] Inventor

"Takeshi Koyama, Kanagawa-ken," should read --Takeshi Koyama, Yokohama,--.

Column 3

Line 19, "below:" should read --below.--.

Column 4

Line 60, "element 5'," should read --element 5",--.

Column 5

Line 27, "the" should read --on the--.
Line 55, "present" should read --present invention--.

Column 6

Line 43, "view finder" should read --viewfinder--.

UNITED STATES PATENT AND TRADEMARK OFFICE
CERTIFICATE OF CORRECTION

PATENT NO. : 6,052,540
DATED : April 18, 2000
INVENTOR(S) : TAKESHI KOYAMA

It is certified that error appears in the above-identified patent and that said Letters Patent is hereby corrected as shown below:

Column 7

Line 11, "reflection type" should read --reflection-type--.
    Line 45, "reflection type" should read --reflection-type--.

Column 9

Line 12, "th is" should read --this--.

Signed and Sealed this

Seventeenth Day of April, 2001

*Attest:*

NICHOLAS P. GODICI

*Attesting Officer*    Acting Director of the United States Patent and Trademark Office